June 4, 1946.  W. E. WILSON  2,401,383
ELECTRODE HOLDER
Filed March 30, 1945
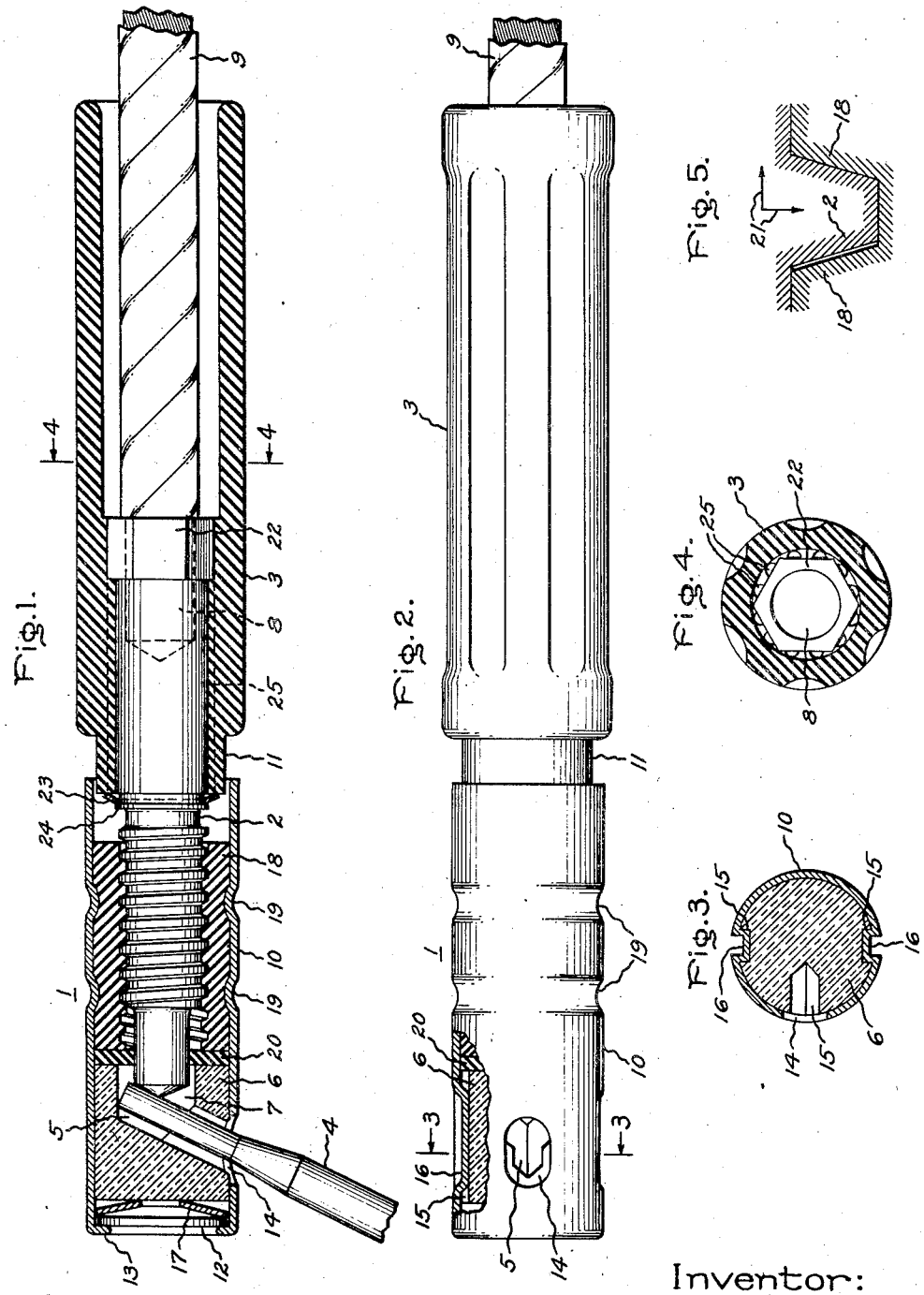
Inventor:
Wayne E. Wilson,
by Harry E. Dunham
His Attorney.

Patented June 4, 1946

2,401,383

UNITED STATES PATENT OFFICE 2,401,383

ELECTRODE HOLDER

Wayne E. Wilson, Schenectady, N. Y., assignor to General Electric Company, a corporation of New York Application March 30, 1945, Serial No. 585,597

13 Claims. (219—8)

My invention relates to electrode holders for use in electric arc welding.

In electric arc welding an arc is established between an electrode and the work by including the electrode and the work in a welding circuit connected with a source of welding current suitable for energizing the arc. One terminal of this welding circuit is connected to the work and the other terminal thereof is connected to the arc welding electrode through the agency of an electrode holder.

When using a fusible metallic electrode, the arcing terminal portion thereof rendered molten by the arc is deposited and commingled with the portions of the work also made molten by the arc, and this molten material upon solidification forms what is known as an arc weld. During welding, molten portions of the work and of the electrode are expelled from the region of the arc, forming what is known as weld spatter. Part of this weld spatter will be deposited on the electrode holder and will in time destroy its utility unless it is suitably constructed to prevent damage or destruction resulting therefrom.

Since the electrode holder transmits the welding current to the electrode held therein, it is obvious that the holder must be designed so as to prevent excessive heating, which in turn requires that a good electrical contact be made between the current conducting portion or portions of the electrode holder and the electrode supported therein. Furthermore the mechanical construction of the electrode holder should be such that a good electrical contact with the electrode is obtained without any great expenditure of energy in operating the electrode clamping mechanism thereof. To insure this good electrical contact with the electrode the arrangement should also be such that heating of the parts of the electrode holder due to resistance losses and to exposure to the heat of the arc will not operate to release the gripping action of the electrode clamp which is obtained at the time the electrode is inserted in the electrode holder by the operator.

It is quite obvious that the electrode holder used in arc welding should be suitably insulated to protect the operator from coming into contact with the welding circuit as well as to protect the electrode holder and the work from damage resulting from accidental contacts between the electrode holder and the work which without such insulation would be productive of destructive arcing conditions between the electrode holder and must be of durable construction in order to withstand successfully the abuse to which it is subjected by being dragged along the work or allowed to fall forcibly upon the work or other objects nearby.

It is an object of my invention to provide an electrode holder which is suitably insulated to protect the operator from shock and to protect the electrode holder and the work from accidental short circuits.

It is a further object of my invention to provide an electrode holder having a head portion clad with a metallic armor which will provide mechanical protection for the insulation of the holder and protect this insulation from the heat of the arc as well as the destructive effects of weld spatter.

It is also an object of my invention to provide an electrode holder of the screw type which may be easily operated by the welder to clamp an electrode firmly therein or release it therefrom and which during welding will firmly hold the electrode even though the parts of the holder should move relative to one another due to heating from resistance losses or exposure to the arc.

Further objects of my invention will become apparent from a consideration of the following description of an embodiment thereof illustrated in the accompanying drawing.

In this drawing Fig. 1 is a side sectional view and Fig. 2 is a bottom view partially in section of this embodiment of my invention. Figs. 3 and 4 of this drawing are respectively sectional views of the electrode holder illustrated in Figs. 2 and 1 along the lines 3—3 and 4—4 thereof. Fig. 5 is an enlarged view of the cooperating threads of the screw clamp forming part of the electrode holder.

In an electrode holder embodying my invention, the bare end portion of an arc welding electrode is held in a jaw member by one end of a contact rod the other end of which is supported in a hollow electrically insulated handle. Welding current is supplied to the electrode through this contact rod which is provided with a welding cable connection located within the handle and electrically insulated therefrom. The electrode holding jaw member is supported in the outer portion of a metallic cap having an internal portion making a threaded engagement with an externally threaded portion of the contact rod projecting from the handle. The internally threaded portion of the cap and the electrode holding jaw tallic cap, the inner end portion of which telescopes the outer end portion of the handle of the electrode holder. The cap is preferably made of some metal which is resistant to weld spatter, for example aluminum, which also serves to absorb, conduct, and radiate the heat to which it is subjected by reason of its proximity to the welding arc. The electrode holder is subjected to the heat of the arc intermittently depending on the time of consuming an electrode during welding and the time required for ejecting the stub end of a used electrode and inserting a new electrode in the holder. Consequently the amount of metal in the cap is made sufficient in accordance with my invention to provide, in accordance with its duty cycle, a heat storage capacity commensurate with its heat conducting and radiating qualities and thereby prevent the occurrence of temperatures which would be destructive of the electrical insulation of the parts enclosed therein.

The electrode holding jaw member of my electrode holder is supported in the cap thereof for endwise movement longitudinally thereof against a spring member located between the cap and the outer end of the jaw member. The jaw member has in registry with an electrode opening in the cap an electrode holding slot extending through its side wall to a longitudinal opening in its inner end portion through which the electrode engaging end of the contact rod projects. A washer or other suitable means closely enclosing the electrode engaging end portion of the contact rod is also provided in the cap for shielding against weld spatter the threaded portions of the cap and the contact rod. The cooperating threads of the cap and contact rod are formed with a spacing greater than their width to prevent wedging of their side surfaces when eccentrically loaded by the end of the contact rod being forced into clamping engagement with the end of an electrode in the inclined electrode holding slot of the jaw member.

My electrode holder illustrated in the drawing is of the screw type having a chuck head 1 making a threaded engagement with a welding current conducting contact rod 2 supported in and projecting from the front end portion of a hollow handle 3. The bare end of a metallic arc welding electrode 4 is clamped in the electrode holding slot 5 of a jaw member 6 forming part of the holder by means of the electrode engaging end of contact rod 2 which projects through a longitudinal opening 7 in the inner end portion of the jaw member. Welding current is supplied to the arc welding electrode through this contact rod which is provided with a welding current cable connection 8 enclosed within hollow handle 3. The welding current cable 9 projects into the hollow handle through its open rear portion as illustrated in the drawing.

The exterior surface of head 1 of the electrode holder is armored against abusive use as well as damage from weld spatter by a metallic cap 10 formed from a tube of aluminum or similar metal which is resistant to weld spatter. The inner end of this cap telescopes a reduced portion 11 of handle 3 and the outer end of this cap is closed by an imperforate aluminum disk 12 which is seated against the inturned edges 13 of the outer end of the cap.

Electrode holding jaw member 6 is supported in and longitudinally movable in the outer end of cap 10 with its electrode holding slot 5 extending transversely of the cap in registry with an electrode opening 14 in the side wall of the cap. This jaw member is provided with longitudinal side wall slots 15 engaged by depressed portions 16 of the cap so as to permit this longitudinal motion thereof in the cap while at the same time preventing rotation thereof about the longitudinal axis of the cap.

A disk spring 17 located between the outer end of jaw member 6 and closure disk 12 of the cap provides a resilient support which resists endwise movement of the jaw member when the electrode engaging end of contact rod 2 is forced against and clamps the bare end of electrode 4 in electrode holding slot 5 of the jaw member. Disk spring 17 is of the type known as a Belleville spring. It is a perforated circular disk which has been dished to a conical shape. When load is applied to its edges it is deflected axially.

Cap 10 of the head portion of the electrode holder is also provided with an internal portion making a threaded engagement with the externally threaded portion of the end of contact rod 2 which projects from the front end of handle 3. As illustrated in the drawing, this threaded portion is formed by the internally threaded screw member 18 which is mounted within cap 10 and secured against longitudinal displacement in the cap as well as rotation about the longitudinal axis of the cap by circumferentially depressed portions 19 of the cap which engage correspondingly grooved portions of internally threaded screw member 18.

A washer 20 which closely encloses the electrode engaging end portion of contact rod 2 which projects into the longitudinal opening in jaw member 6 constitutes means for shielding the threaded portions of screw member 18 and contact rod 2 against weld spatter which may enter the electrode holder through the electrode slot of the jaw member. This washer is located in the cap between jaw member 6 and screw member 18.

It will be noted that electrode holding slot 14 of jaw member 6 is inclined to the longitudinal axis of the electrode holder. Consequently when the bare end of an electrode is held therein by the electrode engaging end of contact rod 2, screw member 18 and contact rod 2, which make a threaded engagement with one another, are eccentrically loaded so that their cooperating threads are forced into wedging engagement with one another along their side surfaces unless these threads are so formed as to avoid this action. I have found that this wedging action may be avoided by making the cooperating threads of these members with a spacing greater than their width in order to provide sufficient end play to prevent this wedging action. When so constructed the cooperating threads will engage one another without this wedging action, as illustrated in Fig. 5, which also shows the force vectors 21 resulting from this eccentric loading. As shown in this figure, the engagement between the threads is made along one of their adjacent side surfaces and between the tops of the threads and the bottoms of the slots between threads. By using this construction and the resiliently supported jaw member 6, electrodes may be firmly held in or released from the holder by a slight twist of the operator's hands applied to the head and handle portions of the electrode holder.

The handle supported end of contact rod 2 is provided with a hexagonal portion 22 which is seated in a corresponding socket portion of hollow handle 3 so that contact rod 2 is secured against rotation in the handle about its longitudinal axis. The hexagonal end portion of contact rod 2 is held in the corresponding socket portion of handle 3 by means of a snap ring 23 located between a shouldered portion 24 of contact rod 2 and the reduced outer end portion 11 of handle 3.

The handle enclosed end portion of contact rod 2 is provided with ventilation and at the same time spaced from intimate contact with the handle by a plurality of grooves 25 formed in the handle and extending along the portion of the contact rod enclosed by the handle. As previously noted, the bared end portion of welding current cable 9 is located in socket 8 formed in the inner end of contact rod 2, and these parts may be joined electrically and mechanically by a soldered or brazed joint as illustrated.

In order to obtain an electrode holder that is one hundred per cent insulated, handle 3 is formed of insulating material and those portions of its head 1 which engage contact rod 2 are electrically insulated from metallic cap 10 forming the outside armored surface of the head. In the arrangement illustrated, this result has been obtained by forming handle 3, electrode holding jaw member 6, washer 20 and internally threaded screw member 18 of some suitable insulating material. For example, the jaw member may be formed of a ceramic material, such as porcelain, and handle 3, washer 20 and internally threaded screw member 18 of some moldable insulating material, such as Textolite, which is a phenolic resin with a fiber filler. Furthermore electrode opening 14 in the side wall of cap 10 is made of sufficient size to space and thereby electrically insulate the cap from an electrode seated in slot 5 of jaw member 6. The jaw member 6 may also be coated with a weld spatter resisting material such as that disclosed and claimed in United States Letters Patent 2,250,940, to Zahn and Patterson, July 29, 1941.

As previously stated, cap 10 is formed of a weld spatter resisting metal, such as aluminum. In view of its intermittent use and the heating and cooling during welding and between welding operations, the amount of metal in the cap, as pointed out above, is made sufficient to provide a heat storage capacity which will prevent during welding the attainment of temperatures destructive of the electrical insulation enclosed therein. Contact rod 2 may be formed of copper or brass or a similar good electrically conducting material. I prefer to use a tellurium copper alloy because of its excellent machining qualities.

The above arrangement provides an electrode holder which is fully insulated electrically. Furthermore the metallic cap provides an armored head portion which is resistant to hard usage, abuse and damage from weld spatter. It also prevents burning of the insulated parts of the holder which would otherwise be subjected to the heat of the arc and weld spatter. It will be noted that the spring between the cap and the outer end of the jaw member provides a resilient or cushion grip which will firmly hold the electrode even though the parts of the holder move a slight amount relatively to one another due to unequal expansion and contraction due to unequal heating and cooling. It will also be noted that the threaded engagement between the head and handle portions of the electrode holder provides sufficient end play between the parts to prevent a wedging action between the side surfaces of these threads when these parts are eccentrically loaded by the clamping action exerted therethrough on an electrode in the jaw member. Thus electrodes may be firmly held in or released from the holder by a slight twist of the operator's hands applied to the head and handle portions thereof. The handle may be provided with a longitudinally grooved hand grip portion, as illustrated, to prevent turning of the handle in the operator's gloved hand. The new electrode or the stub end of a used electrode may be used as a turning bar to enable the operator's gloved hand to apply turning force to the head portion of the holder when loading or unloading an electrode therein, although by use of the cushioned screw grip, this is not a required or necessary procedure.

My electrode holder is small, compact, light in weight, easy to use, and by reason of the arrangement of parts so nicely balanced that operator fatigue is materially reduced. Its armored head portion enables it to withstand successfully the abuse it may receive from a careless operator. Furthermore the threads thereof carry no welding current and consequently overheating due to poor contact conditions resulting from sparking is thereby avoided. Overheating of the handle is also avoided by the ventilated spacing of the contact rod therein. If desired, overheating from overloading may be prevented by forming the electrode slot in the jaw member of a width to limit the size of the electrode that may be inserted therein. Overloading is one of the evils which materially shorten the life of electrode holders.

It is of course apparent that many departures may be made from the particular physical structure of the electrode holder illustrated without in any manner departing from the spirit and scope of my invention. Thus for example the contact rod 2 may be held in the hollow handle 3 by means other than that illustrated. This may be accomplished by providing a diametrical opening through the contact rod for an insulated bushing extending therethrough and provided at its ends with threaded portions for screws, the head portions of which are countersunk in suitable openings in the outer surface of the handle 3 provided therefor.

Furthermore the internally threaded member 18 may be attached by means of set screws to the metallic cap 10 and the electrode holding jaw member 6 may be held in position in the end of the cap 10 by the internally threaded member 18 and caused to rotate therewith by some suitable dovetailing connection between these two members. Likewise the metallic cap 10 may be of constructions other than that illustrated. For example its end portion may be closed by spinning the side walls of the tube to form a dome-shaped closure at its end. In such case the spring washer 17 may be reversed from the position illustrated in the electrode holder of the drawing so that its convex portion is seated in the dome-shaped end of the cap and its concave portion forms a seat for the end of the jaw member which may be suitably shaped to engage this washer along a substantial portion of its concave surface. Furthermore the jaw member 6 and the internally threaded screw member 18 may be formed of metal so long as they are suitably electrically insulated from the cap 10 in which they are located and by means of which they are supported in assembled relationship. The longitudinal passageway in the electrode holder 6 for the electrode engaging end of the contact rod 2 may be suitably reduced in size so as to constitute the antispatter means provided by washer 20 in the electrode holder illustrated. Obviously the electrode engaging end portion of the contact rod may be provided with a wear resisting insert or may be made of some wear resisting electrically conductive material other than the material of which the contact rod 2 is made. These and other arrangements will occur to those skilled in the art.

Thus, in view of the above description of my invention, it is apparent that many variations and modifications thereof may be made by those skilled in the art to which it relates, and I therefore aim to cover by the appended claims all such modifications and variations within the true spirit and scope of my invention.

What I claim as new and desire to secure by Letters Patent of the United States, is:

1. An electrode holder comprising a handle, a welding current conducting contact rod mounted in said handle for resisting rotation about its longitudinal axis and having an externally threaded portion extending beyond the outer end of said handle, a cap having an internal portion making a threaded engagement with said threaded portion of said contact rod, an electrode holding jaw member supported in the outer portion of said cap for rotation therewith and endwise movement longitudinally thereof and having in registry with an electrode opening in said cap an electrode holding slot extending through its side wall to a longitudinal opening in its inner end portion through which the electrode engaging end of said contact rod projects, and means including a spring between said cap and the outer end of said jaw member for resisting endwise movement of said jaw member when by screwing said contact rod into said cap by rotating said cap and handle relatively to one another the end of said contact rod is forced into clamping engagement with an electrode end seated in said electrode holding slot of said jaw member.

2. An electrode holder comprising a handle, a welding current conducting contact rod mounted in said handle for resisting rotation about its longitudinal axis and having an externally threaded portion extending beyond the outer end of said handle, a cap having an internally threaded portion making a threaded engagement with said externally threaded portion of said contact rod, the cooperating threads of said cap and said contact rod having a spacing greater than their width to prevent wedging of their side surfaces when eccentrically loaded, an electrode holding jaw member supported in the outer portion of said cap for rotation therewith and endwise movement longitudinally thereof and having in registry with an electrode opening in said cap an electrode holding slot extending through its side wall to a longitudinal opening in its inner end portion through which the electrode engaging end of said contact rod projects, and means including a spring between said cap and the outer end of said jaw member for resisting endwise movement of said jaw member when by screwing said contact rod into said cap by rotating said cap and handle relatively to one another the end of said contact rod is forced into clamping engagement with an electrode end seated in said electrode holding slot of said jaw member.

3. An electrode holder comprising an electrically insulated handle, an electrically conductive contact rod mounted in said handle for resisting rotation about its longitudinal axis and having an externally threaded portion extending beyond the outer end of said handle from a welding current cable connection at its handle supported end, a cap having an internal portion making a threaded engagement with said threaded portion of said contact rod and a metal-clad surface completely enveloping its external surface and electrically insulated from said contact rod, an electrode holding jaw member supported in the outer portion of said cap for rotation therewith and endwise movement longitudinally thereof and having in registry with an electrode opening in said cap an electrode holding slot extending through its side wall to a longitudinal opening in its inner end portion through which the electrode engaging end of said contact rod projects, and means including a spring between said cap and the outer end of said jaw member for resisting endwise movement of said jaw member when by screwing said contact rod into said cap by rotating said cap and handle relatively to one another the end of said contact rod is forced into clamping engagement with an electrode end seated in said electrode holding slot of said jaw member.

4. An arc welding electrode holder comprising an electrode holding jaw member, a hollow handle of electrically insulating material, a hollow weld spatter resisting metallic cap having said jaw member enclosed therein and electrically insulated therefrom with its electrode holding portion in registry with an electrode opening in its side wall and having an open end telescoping the outer end of said handle, a screw member electrically insulated from and mounted within said cap between said jaw member and the telescoping end of said cap for rotation therewith about the longitudinal axis of said cap, and a welding current conducting contact rod mounted against rotation in said handle and projecting therefrom at its outer end, the projecting end of said contact rod having an externally threaded portion making a threaded engagement with said screw member mounted in said cap and an electrode engaging end portion which is brought into clamping engagement with an electrode in said jaw member by rotating said cap and handle relatively to one another to screw said rod into said screw member, and the end of said contact rod mounted in said handle being electrically insulated therefrom and having a welding cable connection located within said handle and electrically insulated therefrom.

5. An arc welding electrode holder comprising a handle, a hollow cap of weld spatter resisting metal, said cap being closed at its outer end and having its inner end telescoping the outer end of said handle, an electrode holding jaw member of electrically insulating material supported in the closed end of said cap with its electrode holding portion extending transversely of said cap in registry with an electrode opening in said cap of sufficient size to space and thereby electrically insulate said cap from an electrode in said jaw member, an internally threaded screw member electrically insulated from and mounted lengthwise of said cap between said jaw member and the telescoping end of said cap to resist rotation about its longitudinal axis, and a welding current conducting contact rod mounted against rotation in said handle and projecting therefrom at its outer end, the projecting end of said contact rod having an externally threaded portion making a threaded engagement with said internally threaded screw member mounted in said cap and an electrode engaging end portion which is brought into clamping engagement with an electrode in said jaw member by rotating said cap and handle relatively to one another to screw said rod into said screw member, and the end of said contact rod mounted in said handle being electrically insulated therefrom and having a welding cable connection located within said handle and electrically insulated therefrom.

6. An arc welding electrode holder comprising a hollow cap, an electrode holding jaw member supported for rotation with said cap and endwise movement longitudinally thereof, said jaw member having an electrode holding slot extending from a longitudinal opening in one end thereof through its side wall in registry with an electrode opening in said cap, a spring member between said cap and the outer end of said jaw member, an internally threaded screw member mounted for rotation with said cap and extending longitudinally thereof from said longitudinal opening in said jaw member, a handle, and a contact rod projecting from the outer end of said handle and mounted therein to resist rotation about the longitudinal axis, said contact rod having an electrode engaging end portion projecting into said longitudinal opening in said jaw member, an externally threaded portion making threaded engagement with said internally threaded screw member mounted in said cap, and a welding cable connection at its end portion supported in said handle.

7. An arc welding electrode holder comprising a hollow cap, an electrode holding jaw member supported for rotation with said cap and endwise movement longitudinally thereof, said jaw member having an electrode holding slot extending from a longitudinal opening in one end thereof through its side wall in registry with an electrode opening in said cap, a spring member between said cap and the outer end of said jaw member, an internally threaded screw member extending longitudinally of said cap from said longitudinal opening in said jaw member and mounted therein for rotation therewith about its longitudinal axis, a handle, a contact rod projecting from the outer end of said handle and mounted therein to resist rotation about its longitudinal axis, said contact rod having an electrode engaging end portion projecting into said longtudinal opening in said jaw member, an externally threaded portion making threaded engagement with said internally threaded screw member mounted in said cap, and a welding cable connection at its end portion supported in said handle, and means in said cap and closely enclosing the electrode engaging end portion of said contact rod projecting into said longitudinal opening in said jaw member for shielding against weld spatter the threaded portions of said screw member and said contact rod.

8. An arc welding electrode holder comprising a hollow handle of electrically insulating material, a hollow cap of weld spatter resisting metal, said cap being closed at its outer end and having its inner end telescoping the outer end of said handle, an electrode holding jaw member made of electrically insulating material and supported in said cap with its electrode holding portion extending transversely of said cap in registry with an electrode opening in said cap, said jaw member being mounted for rotation with said cap and longitudinally movable in the outer end thereof, a spring member between said jaw member and the closed end of said cap, an internally threaded screw member electrically insulated from and mounted lengthwise of said cap between said jaw member and the telescoping end of said cap for rotation therewith about its longitudinal axis, and a welding current conducting contact rod mounted against rotation in said hollow handle and projecting therefrom at its outer end, the projecting end of said contact rod having an electrode engaging end portion adjacent said jaw member and an externally threaded portion making a threaded engagement with said internally threaded screw member mounted in said cap, and the end of said contact rod mounted in said handle having a welding cable connection located within said hollow handle.

9. An arc welding electrode holder comprising a handle, a hollow cap closed at its outer end and having its inner end telescoping the outer end of said handle, an electrode holding jaw member supported for rotation with said cap and longitudinally movable in the outer end thereof with its electrode holding portion extending transversely of said cap in registry with the electrode opening in said cap, a spring member between said jaw member and the closed end of said cap, an internally threaded screw member extending longitudinally of said cap between said jaw member and the telescoping end of said cap and mounted therein for rotation therewith about its longitudinal axis, a welding current conducting contact rod mounted against rotation in said hollow handle and projecting therefrom at its outer end, the projecting end of said contact rod having an electrode engaging end portion adjacent said jaw member and an externally threaded portion making threaded engagement with said internally threaded screw member mounted in said cap, the cooperating threads on said screw member and said contact rod being constructed and arranged to provide sufficient end play between said parts to prevent wedging action between the side surfaces of said threads when said parts are eccentrically loaded by the clamping action exerted therethrough on an electrode in said jaw member, and a welding cable connection at the handle supported end of said contact rod.

10. An arc welding electrode holder comprising a handle, a hollow cap closed at its outer end and having its inner end telescoping the outer end of said handle, an electrode holding jaw member supported for rotation with said cap and movement longitudinally thereof in its outer end with its electrode holding portion extending transversely of said cap in registry with the electrode opening in said cap, a spring member between said jaw member and the closed end of said cap, an internally threaded screw member extending longitudinally of said cap between said jaw member and the telescoping end of said cap and mounted for rotation therewith about its longitudinal axis, a welding current conducting contact rod mounted against rotation in said hollow handle and projecting therefrom at its outer end, the projecting end of said contact rod having an electrode engaging end portion adjacent said jaw member and an externally threaded portion making threaded engagement with said internally threaded screw member mounted in said cap, the cooperating threads on said screw member and said contact rod having a spacing greater than their width in order to prevent wedging of their side surfaces when said screw member and said rod are eccentrically loaded by the clamping action exerted therethrough on an electrode in said jaw member, means closely enclosing the electrode engaging end portion of said contact rod adjacent said jaw member for shielding against weld spatter the threaded portions of said screw members and said contact rod, and a welding cable connection at the handle supported end of said contact rod.

11. An arc welding electrode holder comprising a hollow cap, a cup-shaped electrode holding jaw member having side walls supported for longitudinal movement in said cap and rotation therewith and having an electrode holding passageway extending from the inner end of said cup through its side walls in registry with an electrode opening in said cap, a disk spring member between said cap and the closed end of said cup-shaped jaw member, an internally threaded screw member mounted for rotation with said cap and extending longitudinally thereof from the open end of said cup-shaped jaw member, a handle, a welding current conducting contact rod mounted against rotation in said handle and projecting therefrom at its outer end, the projecting end of said contact rod having an electrode engaging end portion projecting into the open end of said cup-shaped jaw member and an externally threaded portion making threaded engagement with said internally threaded screw member mounted in said cap, and a welding cable connection at the handle supported end of said contact rod.

12. An arc welding electrode holder comprising a handle, a welding current conducting contact rod electrically insulated from and mounted against rotation in said handle and having an externally threaded portion between its electrode engaging outer end and said handle, means for connecting said contact rod to a welding current conductor, an electrode holding jaw member having a longitudinal opening in its end for the electrode engaging end of said contact rod and an electrode slot extending from said longitudinal opening through its side wall, a screw member engaging the threaded portion of said contact rod, and a hollow metallic cap within which said jaw member and said screw member are positioned for rotation therewith in operative relationship with the projecting end of said contact rod, said cap having an opening in its side wall laterally spaced from and in registry with said electrode slot in said jaw member and being electrically insulated from said contact rod by material enclosed therein and the amount of metal in said cap being sufficient to provide radiation and heat storage capacity capable of maintaining the temperature of said cap below the destructive temperature of said electrical insulating material enclosed therein when said cap is subjected intermittently to heating and cooling periods respectively depending on the time of its exposure to the arc during welding and the time required between welding operations for changing electrodes.

13. An arc welding electrode holder comprising a hollow handle, a welding current conducting contact rod mounted against rotation in said handle and projecting therefrom at its outer end, the projecting end of said contact rod having an externally threaded portion between its electrode engaging outer end and said handle and the end of said contact rod mounted in said handle being electrically insulated therefrom and having a welding cable connection located within said handle and electrically insulated therefrom, an electrode holding jaw member having a longitudinal opening in its end for the electrode engaging end of said contact rod and an electrode slot extending from said longitudinal opening through its side wall, a screw member engaging the threaded portion of said contact rod, and a hollow metallic cap within which said jaw member and said screw member are positioned for rotation therewith in operative relationship with the projecting end of said contact rod, said cap having an opening in its side wall laterally spaced from and in registry with said electrode slot in said jaw member and being electrically insulated from said contact rod by material enclosed therein and the amount of metal in said cap being sufficient to provide radiation and heat storage capacity capable of maintaining the temperature of said cap below the destructive temperature of said electrical insulating material enclosed therein when said cap is subjected intermittently to heating and cooling periods respectively depending on the time of its exposure to the arc during welding and the time required between welding operations for changing electrodes.

WAYNE E. WILSON.